US008095868B2

(12) United States Patent
Kawabuchi et al.

(10) Patent No.: US 8,095,868 B2
(45) Date of Patent: Jan. 10, 2012

(54) DOCUMENT MANAGEMENT DEVICE AND DOCUMENT MANAGEMENT METHOD

(75) Inventors: Yoichi Kawabuchi, Itami (JP); Yoshikazu Ikenoue, Itami (JP); Masakazu Murakami, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1095 days.

(21) Appl. No.: 11/318,534

(22) Filed: Dec. 28, 2005

(65) Prior Publication Data
US 2007/0047013 A1 Mar. 1, 2007

(30) Foreign Application Priority Data
Aug. 25, 2005 (JP) .................................. 2005-243687

(51) Int. Cl.
G06F 17/00 (2006.01)
(52) U.S. Cl. ...................................................... 715/229
(58) Field of Classification Search .................. 715/229, 715/230
See application file for complete search history.

(56) References Cited

U.S. PATENT DOCUMENTS

| 5,546,565 | A |   | 8/1996  | Suzuki |
| 5,767,847 | A | * | 6/1998  | Mori et al. ..................... 715/733 |
| 5,819,040 | A | * | 10/1998 | Ogaki et al. ................... 709/217 |
| 5,848,248 | A | * | 12/1998 | Kawasaki et al. ............. 709/238 |
| 5,940,829 | A | * | 8/1999  | Tsuiki et al. ..................... 707/10 |
| 6,144,955 | A | * | 11/2000 | Tsuiki et al. ........................ 707/1 |
| 6,151,583 | A | * | 11/2000 | Ohmura et al. ................... 705/8 |
| 6,154,753 | A | * | 11/2000 | McFarland ..................... 715/221 |
| 6,279,031 | B1 | * | 8/2001  | Kawasaki et al. ............. 709/207 |
| 6,298,154 | B1 |   | 10/2001 | Cok |
| 6,356,923 | B1 | * | 3/2002  | Yano et al. ..................... 717/127 |
| 6,502,087 | B1 | * | 12/2002 | Tsuiki et al. ........................ 707/1 |
| 6,526,425 | B2 | * | 2/2003  | Mori et al. ..................... 715/229 |
| 6,622,162 | B2 | * | 9/2003  | Kawasaki et al. ............. 709/207 |
| 6,643,401 | B1 |   | 11/2003 | Kashioka et al. |
| 6,651,033 | B2 | * | 11/2003 | Nemoto et al. ................ 702/182 |
| 6,703,633 | B2 |   | 3/2004  | Tullis |
| 7,035,910 | B1 | * | 4/2006  | Dutta et al. ..................... 715/200 |
| 7,472,341 | B2 | * | 12/2008 | Albornoz et al. .............. 715/230 |

(Continued)

FOREIGN PATENT DOCUMENTS
JP 2002-074321 A 3/2002
(Continued)

OTHER PUBLICATIONS

Japanese Office Action dated Mar. 18, 2008 (with English Language Translation).

Primary Examiner — Laurie Ries
Assistant Examiner — Frank D Mills
(74) Attorney, Agent, or Firm — Buchanan Ingersoll & Rooney PC

(57) ABSTRACT

The document management device manages documents circulated to a reader according to a circulation tree and additional information added to the documents by the readers. The circulation tree indicates the circulation order of a plurality of readers, and includes at least a first group and a second group. The document management device includes: document circulation unit for enabling a reader of the circulation tree to read predetermined document data; recognition unit for recognizing additional information added by the reader as electronic data; and additional information management unit for managing the additional information by associating it with document data determined for each group to which the reader belongs.

9 Claims, 11 Drawing Sheets

U.S. PATENT DOCUMENTS

| | | | |
|---|---|---|---|
| 2001/0013044 A1* | 8/2001 | Mori et al. | 707/511 |
| 2001/0047371 A1* | 11/2001 | Kawasaki et al. | 707/511 |
| 2002/0059222 A1* | 5/2002 | Sasaki et al. | 707/5 |
| 2002/0073161 A1* | 6/2002 | Yamazaki et al. | 709/206 |
| 2002/0078088 A1* | 6/2002 | Kuruoglu et al. | 707/512 |
| 2002/0107886 A1* | 8/2002 | Gentner et al. | 707/511 |
| 2002/0133315 A1* | 9/2002 | Nemoto et al. | 702/187 |
| 2002/0133316 A1* | 9/2002 | Nemoto et al. | 702/188 |
| 2003/0051213 A1* | 3/2003 | Mitsui | 715/511 |
| 2003/0115547 A1* | 6/2003 | Ohwada et al. | 715/511 |
| 2003/0214528 A1* | 11/2003 | Pierce et al. | 345/723 |
| 2004/0019879 A1* | 1/2004 | Segawa et al. | 717/124 |
| 2004/0064356 A1* | 4/2004 | Saito et al. | 705/9 |
| 2004/0139391 A1* | 7/2004 | Stumbo et al. | 715/512 |
| 2004/0264811 A1* | 12/2004 | Yano et al. | 382/306 |
| 2005/0160356 A1* | 7/2005 | Albornoz et al. | 715/512 |
| 2006/0010097 A1* | 1/2006 | Hashimoto | 707/1 |
| 2006/0044619 A1* | 3/2006 | Namiki et al. | 358/3.28 |

FOREIGN PATENT DOCUMENTS

| | | |
|---|---|---|
| JP | 2004-080601 A | 3/2004 |
| JP | 2004-328451 A | 11/2004 |
| JP | 2004-341914 A | 12/2004 |
| JP | 2005-050018 | 2/2005 |
| JP | 2005-135211 | 5/2005 |

* cited by examiner

DOCUMENT MANAGEMENT DEVICE AND DOCUMENT MANAGEMENT METHOD

This application claims priority of Japanese Patent Application No. 2005-243687 filed in Japan on Aug. 25, 2005, the contents of which are hereby incorporated by reference.

BACKGROUND OF THE INVENTION

1. Field of the Invention

The present invention relates to a document management device and a document management method for managing documents circulated to readers via network and additional information added to the documents by readers.

2. Description of the Related Art

There are proposed various circulation systems for circulating document data automatically via network and electronic approval systems. Further, in a work flow of document deliberation, there is a usage example in which a person requesting deliberation circulates a deliberation document to readers, and each of them writes comments in the original document and the comments are gathered by a handwriting recognition system. As a technique for recognizing comments written in the original document as described above, there is one in which image data of the original electronic file is processed to be expanded and is aligned with a retouched printed matter, and difference information is extracted by exclusive OR, and the original document data and the difference information are saved, as shown in Japanese Patent Laid-open Publication No. 2004-341914. Further, there is a technique in which code information is read out from a printed matter so as to read out original data, and a handwritten memo which is a difference between the original data and the printed matter is extracted, and output can be performed by selecting the memo only, the original only or both, as shown in Japanese Patent Laid-open Publication No. 2004-80601. Further, there is a technique in which handwritten data and print data are synthesized and displayed, and the handwritten data is edited on the display screen, and the print data and the handwritten data synthesized are stored while being associated to each other, as shown in Japanese Patent Laid-open Publication No. 2004-328451. Further, there is a technique in which a file name is written by hand in a file name field of a manuscript and when scanning is performed, an electronic file is automatically created with the file name, as shown in Japanese Patent Laid-open Publication No. 2002-74321.

However, the conventional techniques described above are separate systems such as a circulation system and a handwriting recognition system, so it is required to configure a system by installing, into a PC, a separate dedicated application for each. Therefore, preparation for using them actually is troublesome. Further, since they are separate independent systems, initial registration and progress management of documents must be performed separately, which causes a number of work units. In addition, a user in charge thereof must handle corresponding to each system and application, which causes a problem of bad operability.

In the usage example in the conventional technique described above, if comments added to a circulated document are extracted and managed corresponding to the document, there may be a method in which all comments are managed by being corresponded to the original document.

In such a case, however, if a circulation mode in which the original document is circulated by a plurality of group units, all comments are corresponded to the original document, not depending on each separate group. This causes a problem that each of the comments cannot be classified that from which group it comes from, so management of comments is ineffective. Further, if management is performed to each document circulated, management becomes complicated and the management cannot be unified.

SUMMARY OF THE INVENTION

An object of the present invention is to provide a document management device and a document management method capable of performing collective management of an original document and comments added by readers flexibly and effectively.

A document management device according to the present invention is a device for managing a document circulated in accordance with a circulation tree and additional information added to the document by the reader. The circulation tree indicates the circulation order of a plurality of readers, and the circulation tree includes at least a first group and a second group. The device includes: document circulation unit for enabling a reader of the circulation tree to read predetermined document data; recognition unit for recognizing additional information added by the reader as electronic data; and additional information management unit for managing the additional information by associating it with document data determined for each group to which the reader belongs.

When a document circulated to the first reader of at least one of the groups is assumed as the $0^{th}$ generation document data, the document circulation unit may enable the $n^{th}$ (n is an integer not less than 2) reader of the group to read the $n-1^{th}$ generation document data which cumulatively includes the $1^{st}$ to $n-1^{th}$ pieces of additional information added to the $0^{th}$ generation document data by the first reader to the $n-1^{th}$ reader of the first group, respectively.

Further, when a document circulated to the $m^{th}$ (m is an integer not less than 1) reader of the circulation tree is assumed as the $m-1^{th}$ generation document data, the document circulation unit may enable the $n^{th}$ (n is an integer larger than m and not less than 2) reader of the circulation tree to read the $n-1^{th}$ generation document data which cumulatively includes the $m^{th}$ to $n-1^{th}$ pieces of additional information added to the $m-1^{th}$ generation document data by the $m^{th}$ reader to the $n-1^{th}$ reader of the circulation tree.

The document management device may further comprise record unit for recording the $0^{th}$ generation document data, the $1^{th}$ generation document data including the additional information added to the $0^{th}$ generation document data by the first reader, and the $2^{nd}$ to $n^{th}$ generation document data.

The recognition unit may recognize the additional information based on a difference between document data including the additional information added by the reader and document data circulated to the reader.

Further, the recognition unit may recognize the additional information as document data when it is added as document data, and recognize it as image data when it is added as image data.

A document management method according to the present invention is a method for managing a document circulated in accordance with a circulation tree and additional information added to the document by the reader. The circulation tree indicates the circulation order of a plurality of readers, and the circulation tree includes at least a first group and a second group. The method includes: enabling a reader of the circulation tree to read predetermined document data; recognizing additional information added by the reader as electronic data;

and managing the additional information by associating it with document data determined for each group to which the reader belongs.

When a document circulated to the first reader of at least one of the groups is assumed as the $0^{th}$ generation document data, in the step of enabling to read the document data, the $n^{th}$ (n is an integer not less than 2) reader of the group may be enabled to read the $n-1^{th}$ generation document data which cumulatively includes the $1^{st}$ $n-1^{th}$ pieces of additional information added to the $0^{th}$ generation document data by the first reader to the $n-1^{th}$ reader of the first group, respectively.

Further, when a document circulated to the $m^{th}$ (m is an integer not less than 1) reader of the circulation tree is assumed as the $m-1^{th}$ generation document data, in the step of enabling to read the document data, the $n^{th}$ (n is an integer larger than m and not less than 2) reader of the circulation tree may be enabled to read the $n-1^{th}$ generation document data which cumulatively includes the $m^{th}$ to $n-1^{th}$ pieces of additional information added to the $m-1^{th}$ generation document data by the $m^{th}$ reader to the $n-1^{th}$ reader.

The document management method may further comprise a step of recording the $0^{th}$ generation document data, the $1^{st}$ generation document data including the additional information added to the $0^{th}$ generation document data by the first reader, and the $2^{nd}$ to $n^{th}$ generation document data.

In the step of recognizing, the additional information may be recognized based on a difference between document data including the additional information added by the reader and document data circulated to the reader.

Further, in the step of recognizing, the additional information may be recognized as document data when it is added as document data, and recognized as image data when it is added as image data.

Further, the present invention may be configured as a document management program for prompting a computer to execute the document management method. Further, the document management program may be stored on a computer readable recording medium.

According to the document management device and the document management method of the present invention, it is possible to collectively manage information retouched to distributed child copies and grandchild copies by associating it with a document of an arbitral generation for plural groups. Further, since the generation of collective management is selectable arbitrarily, a flexible collective management is possible. Thereby, the present invention can perform collective management with respect to various types of additional information, and can be applied generally.

BRIEF DESCRIPTION OF THE DRAWINGS

The present invention will become readily understood from the following description of preferred embodiments thereof made with reference to the accompanying drawings, in which like parts are designated by like reference numeral and in which.

DETAILED DESCRIPTION OF THE INVENTION

Figure 1:
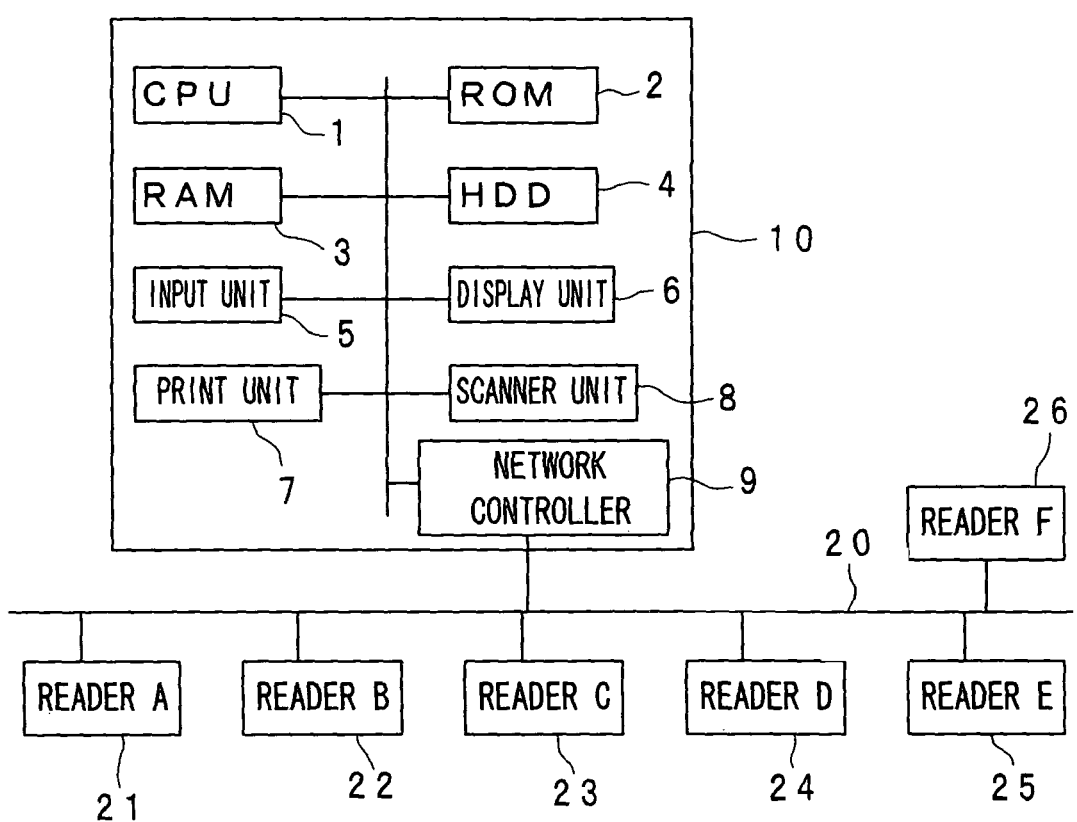
FIG. 1 is a block diagram showing the physical configuration of the document management device according to an embodiment 1 of the present invention.

A document management device and a document management method according to embodiments of the present invention will be explained by using accompanying drawings. Note that substantially same members in the drawings are denoted by the same reference numerals.

Embodiment 1

FIG. 1 is a block diagram showing the physical configuration of a document management device 10 according to an embodiment 1 of the present invention. The document management device 10 is connected with a reader A 21, a reader B 22, a reader C 23, a reader D 24, a reader E 25 and a reader F 26 over a network 20. Further, the document management device 10 includes a CPU 1, a ROM 2, a RAM 3, an HDD 4, an input unit 5, a display unit 6, a print unit 7, a scanner unit 8 and a network controller 9.

Figure 2:
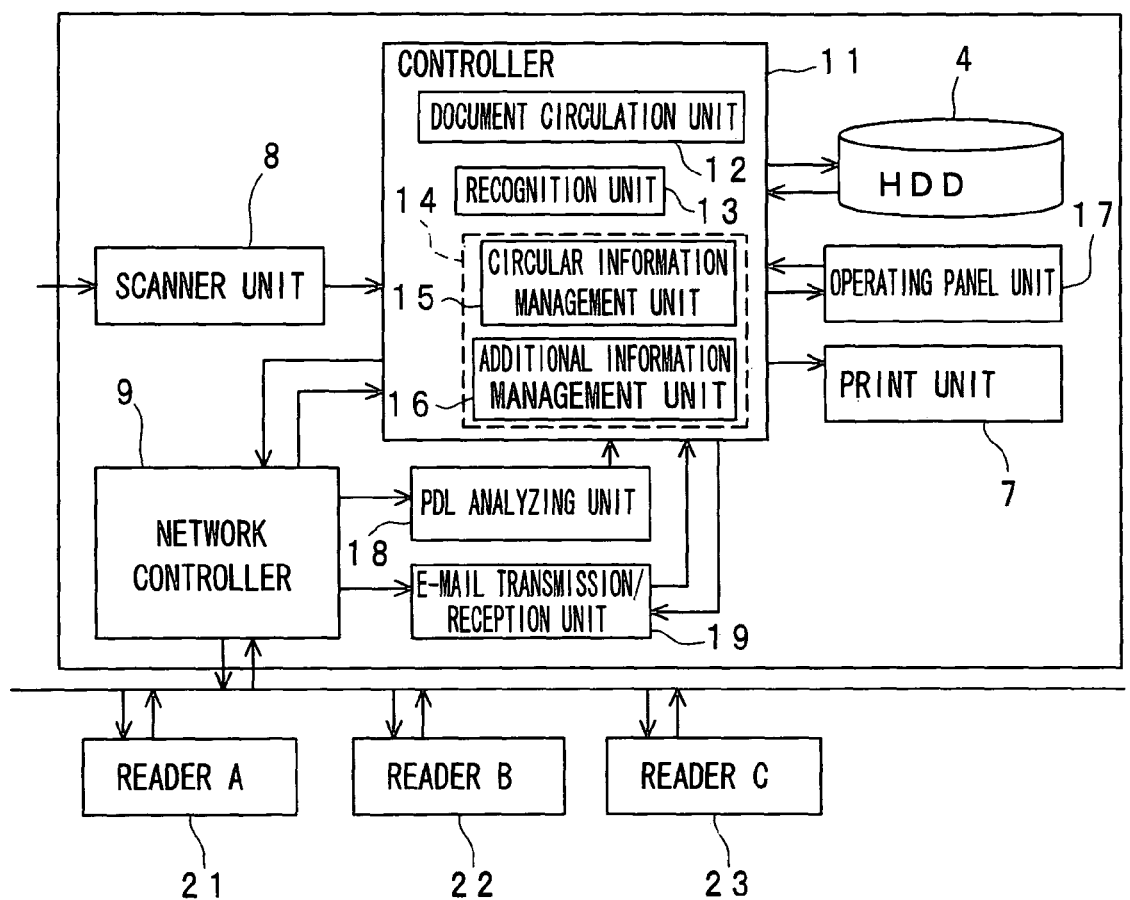
FIG. 2 is a block diagram showing the functional configuration of the document management device according to the embodiment 1 of the present invention.

FIG. 2 is a block diagram showing the functional configuration of the document management device 10. From a functional viewpoint, the document management device 10 includes the HDD 4, the print unit 7, the scanner unit 8, the network controller 9, a controller 11, an operating panel 17, a PDL analyzing unit 18, and an E-mail transmission/reception unit 19. Further, the controller 11 includes a document circulation unit 12, a recognition unit 13, a circular information management unit 15 and an additional information management unit 16. Note that the circular information management unit 15 and the additional information management unit 16 constitute an information management unit 14.

Next, each constitutional member of the document management device 10 will be explained.

In the print unit 7, document data is printed on a sheet. The scanner part 8 reads out a sheet document, and obtains image data as electronic data. Further, the network controller 9 transmits/receives packet data via network such as a LAN. The PDL (printer description language) analyzing unit 18 analyzes print data and converts it into image data. The E-mail transmission/reception unit 19 converts a document with comments after deliberation, transmitted from terminals 21, 22 and 23 of respective readers by E-mail, into image data. The operating panel 17 is one formed by combining the input unit 5 and the display unit 6 of FIG. 1, which displays a login screen and a box screen and receives key inputs and the like for work setting. The controller 11 manages circular documents and additional information added by the readers, and performs work control for circulation and the like. Further, the document circulation unit 12 of the controller 11 enables the $n^{th}$ (n is an integer not less than 2) reader to read the $n-1^{th}$ generation document data which includes the $1^{st}$ $n-1^{th}$ pieces of additional information added to the $0^{th}$ generation document data by the first reader to the $n-1^{th}$ reader of a circulation tree including a plurality of groups. The recognition unit 13 recognizes the $n^{th}$ additional information added by the $n^{th}$ reader as electronic data. The circular information management unit 15 sets a circulation tree indicating the circulation order of a plurality of readers. Further, the additional information management unit 16 manages the $n^{th}$ additional information recognized, in association with document data of a generation set beforehand, corresponding to a group to which the reader belongs.

Figure 3:
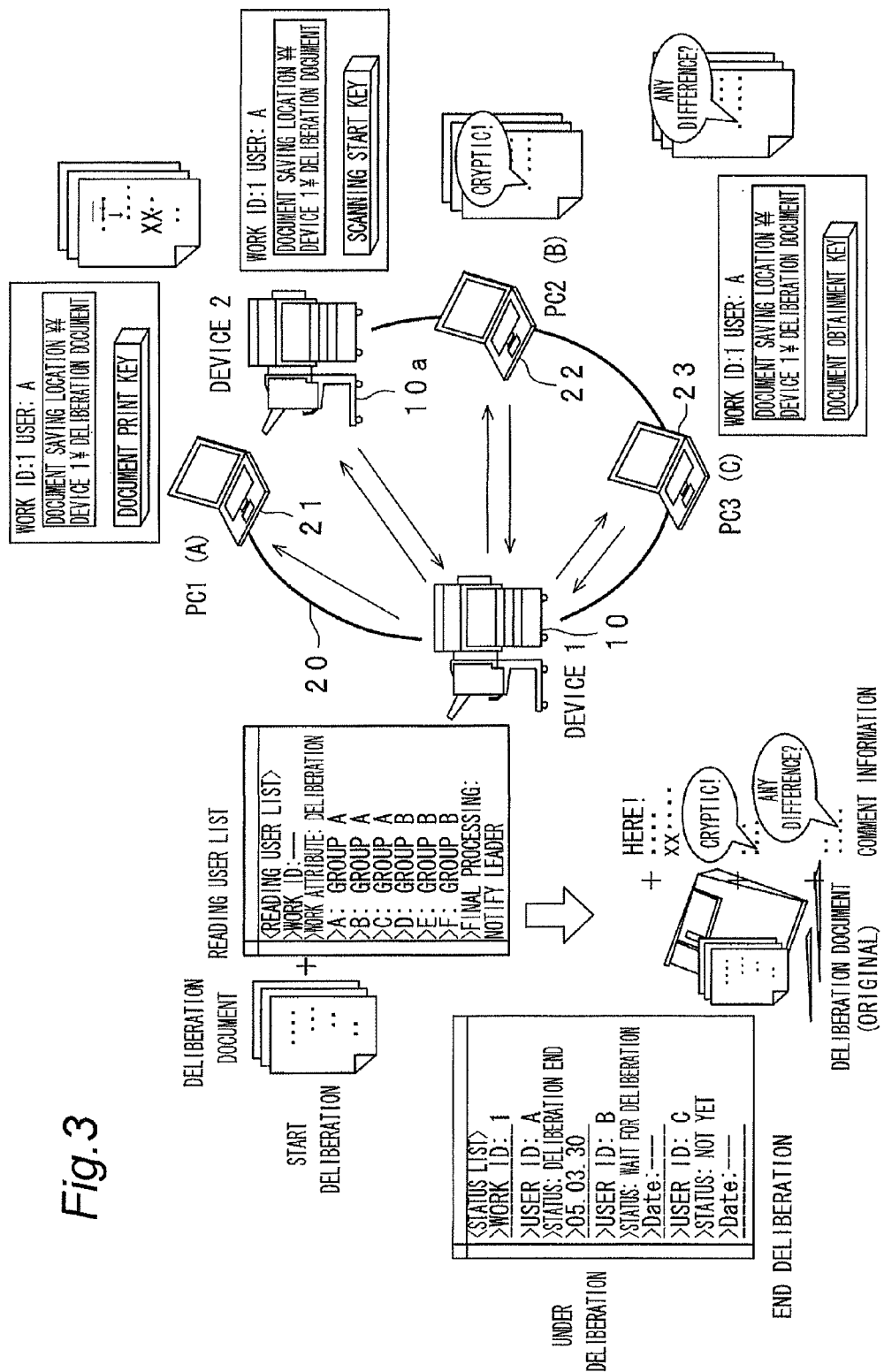
FIG. 3 is a schematic diagram showing an example of a document management system including the document management device according to the embodiment 1 of the present invention.

FIG. 3 is a schematic diagram showing the configuration of a document management system including the document management device 10, user terminals 21, 22 and 23 of respective readers (A, B and C) connected over the network 20, and another document management device 10a. A circular document can be read by each reader from the document management device 10 in the circulation order which has been set (a reading user list in FIG. 3). Each reader reads the circular document by printing it on a sheet or as an electronic document. Further, after adding additional information on the circular document (e.g., comments such as "Cryptic!" or "Any difference?"), the reader transmits the document including the additional information to the document management device 10. In FIG. 3, a reader A prints the circular document on a sheet, and adds additional information by handwriting. Then, the sheet document including the additional information is converted into image data by a scanning function of the document management device 10a, and transmitted to the document management device 10. The document management device 10 extracts the additional information based on the difference between the transmitted document including the additional information and the previous circular document circulated to be readable by the reader, and manages the additional information in association with the original document. Then, the document management device 10 enables the circular document to be read by the next reader, extracts the additional information in the same procedure, and manages it in association with the original document. Note that in FIG. 3, "deliberation" is used instead of "circulation", and a "circular document" is indicated as a "deliberation document".

Figure 4:
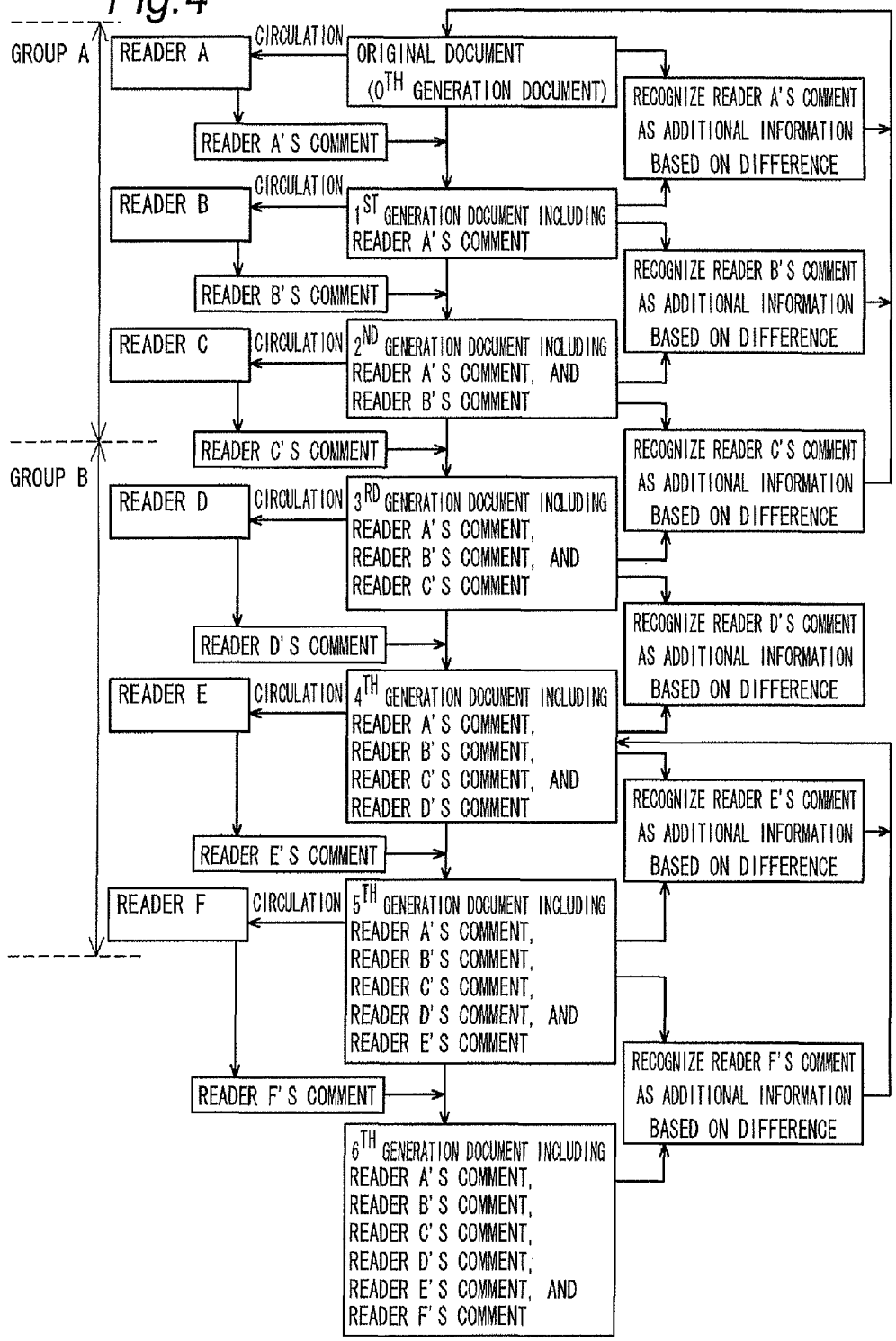
FIG. 4 is a schematic diagram showing an example of generation management of circulated documents and additional information in a document management method according to the embodiment 1 of the present invention.

FIG. 4 is a schematic diagram showing circular documents circulated to respective readers of a group A and a group B and extraction of additional information, in the document management system in FIG. 3. By using FIG. 4, explanation will be given for the relationship between a circular document and additional information in a case where the document are circulated from a reader A of the group A via a reader B to a reader C, and then the document is circulated from a reader D to reader F of the group B.

(a) First, the $0^{th}$ generation document, which is the original document, is circulated to the reader A who is the first reader of the group A. Here, for each of the group A and the group B, additional information is managed in association with the $0^{th}$ generation document.

(b) The reader A adds comments to the $0^{th}$ generation document. This document in which the comments from the reader A are added to the $0^{th}$ generation document is referred to as $1^{st}$ generation document.

(c) The comments from the reader A are extracted as additional information based on the difference between the $1^{st}$ generation document and the $0^{th}$ generation document.

(d) The additional information from the reader A is managed in association with the $0^{th}$ generation document which is the original document.

(e) Next, the $1^{st}$ generation document is circulated to the reader B.

(f) The reader B adds comments to the $1^{st}$ generation document. The document in which the comments from the reader B are added to the $1^{st}$ generation document is referred to as $2^{nd}$ generation document.

(g) The comments from the reader B are extracted as additional information based on the difference between the $2^{nd}$ generation document and the $1^{st}$ generation document.

(h) The additional information from the reader B is managed in association with the $0^{th}$ generation document.

(i) Next, the $2^{nd}$ generation document is circulated to the reader C.

(j) The reader C adds comments to the $2^{nd}$ generation document. The document in which the comments from the reader C are added to the $2^{nd}$ generation document is referred to as $3^{rd}$ generation document.

(k) The comments from the reader C are extracted as additional information based on the difference between the $3^{rd}$ generation document and the $2^{nd}$ generation document.

(l) The additional information from the reader C is managed in association with the $0^{th}$ generation document.

(a) Next, the $3^{rd}$ generation document is circulated to the reader D who is the first reader of the group B.

(b) The reader D adds comments to the $3^{rd}$ generation document. This document in which the comments from the reader D are added to the $3^{rd}$ generation document is referred to as $4^{th}$ generation document.

(c) The comments from the reader D are extracted as additional information based on the difference between the $4^{th}$ generation document and the $3^{rd}$ generation document.

(d) The additional information from the reader D is managed in association with the $4^{th}$ generation document.

(e) Next, the $4^{th}$ generation document is circulated to the reader E.

(f) The reader E adds comments to the $4^{th}$ generation document. The document in which the comments from the reader E are added to the $4^{th}$ generation document is referred to as $5^{th}$ generation document.

(g) The comments from the reader E are extracted as additional information based on the difference between the $5^{th}$ generation document and the $4^{th}$ generation document.

(h) The additional information from the reader E is managed in association with the $4^{th}$ generation document.

(i) Next, the $5^{th}$ generation document is circulated to the reader F.

(j) The reader F adds comments to the $5^{th}$ generation document. The document in which the comments from the reader F are added to the $5^{th}$ generation document is referred to as $6^{th}$ generation document.

(k) The comments from the reader F are extracted as additional information based on the difference between the $6^{th}$ generation document and the $5^{th}$ generation document.

(l) The additional information from the reader F is managed in association with the $4^{th}$ generation document.

In this way, a document in which comments from the reader A to the reader F are added cumulatively is circulated to the next reader over the two groups. Further, comments added by each reader are extracted based on the difference between the documents before and after the circulation, and are managed in association with the original document.

Figure 5:
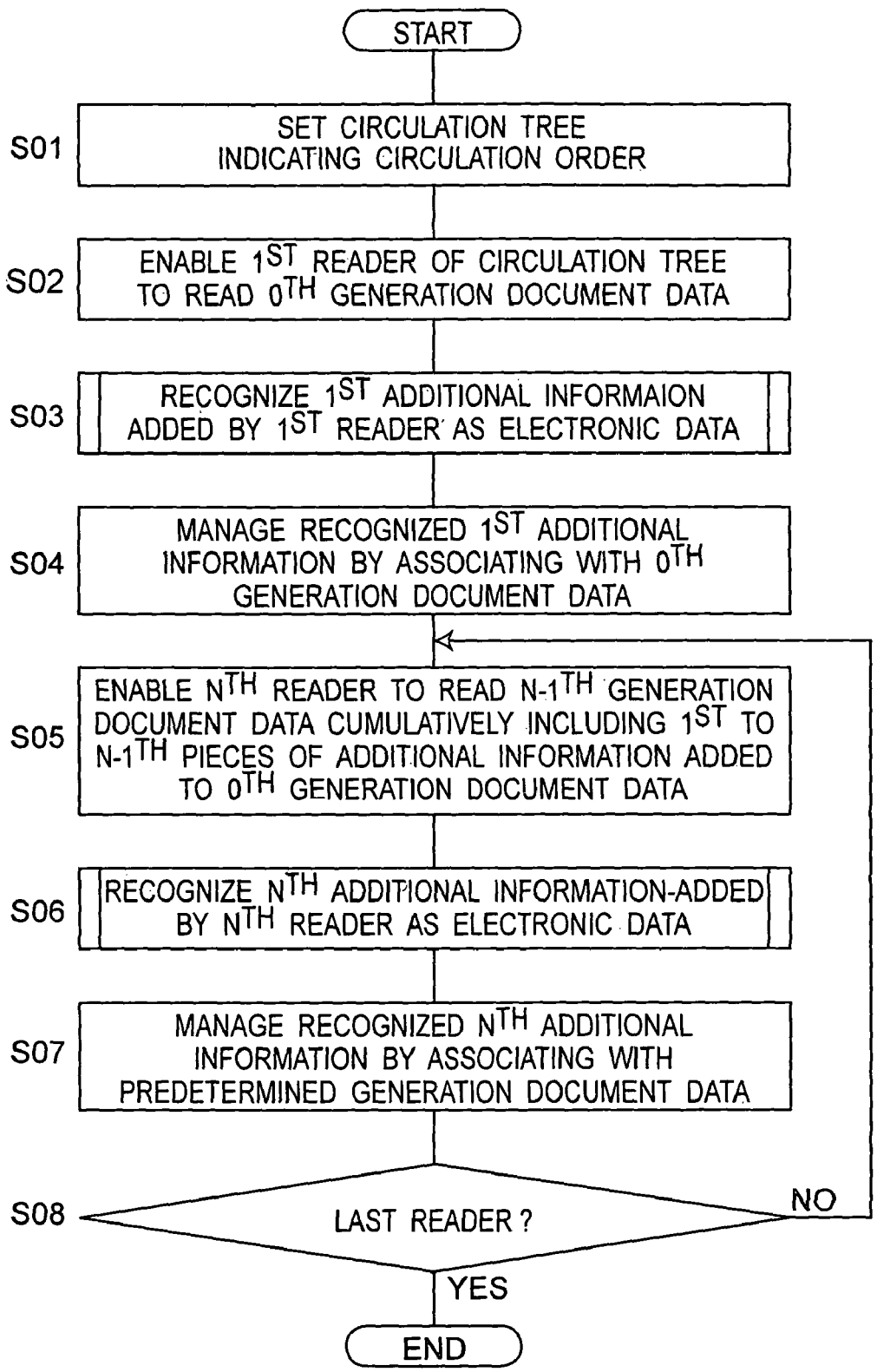
FIG. 5 is a flowchart showing the document management method according to the embodiment 1 of the present invention.

FIG. 5 is a flowchart showing a document management method according to the embodiment 1 of the present invention.

(a) First, a circulation tree indicating the circulation order of a plurality of readers is set (S01).

(b) The $0^{th}$ generation document data is made to be readable by the first reader in the circulation tree (S02). A method of enabling reading in this case is not limited specifically. For example, the $0^{th}$ generation document data may be transmitted to the first reader. Alternatively, a storing location of the $0^{th}$ generation document data stored on a file server may be notified to the first reader, and reading by the first reader may be authorized. The reader may print the $0^{th}$ generation document data on a sheet or display it as an electronic document.

(c) The $1^{st}$ additional information added by the first reader is recognized as electronic data (S03). This recognizing step S03 will be described later in detail together with step S06.

(d) The $1^{st}$ additional information recognized is managed in association with the $0^{th}$ generation document data (S04).

(e) To the second and after readers, the $n-1^{th}$ (n is an integer not less than 2) generation document data which cumulatively includes the $1^{st}$ to the $n-1^{th}$ pieces of additional information in the $0^{th}$ generation document data is made to be readable by the $n^{th}$ reader (S05). For example, for the second reader, the $1^{st}$ generation document data in which the $1^{st}$ piece of additional information from the first reader is added to the $0^{th}$ generation document data is made to be readable. Further, for the third reader, the $2^{nd}$ generation document data in which the $1^{st}$ piece of additional information from the first reader and the $2^{nd}$ piece of additional information from the second reader are added cumulatively to the $0^{th}$ generation document data is made to be readable.

(f) The $n^{th}$ additional information added by the $n^{th}$ reader is recognized as electronic data (S06). This recognizing step S06 will be described later in detail together with step S03.

(g) The $n^{th}$ additional information recognized is managed in association with the $0^{th}$ generation document data (S07).

(h) It is determined whether he/she is the last reader (S08). If he/she is the last reader, the processing ends. On the other hand, if he/she is not the last reader, the processing moves to step S05, and the $n^{th}$ generation document is made to be readable by the next $n+1^{th}$ reader.

In this way, the circular document and the additional information from the readers can be managed in concentration.

Figure 7:
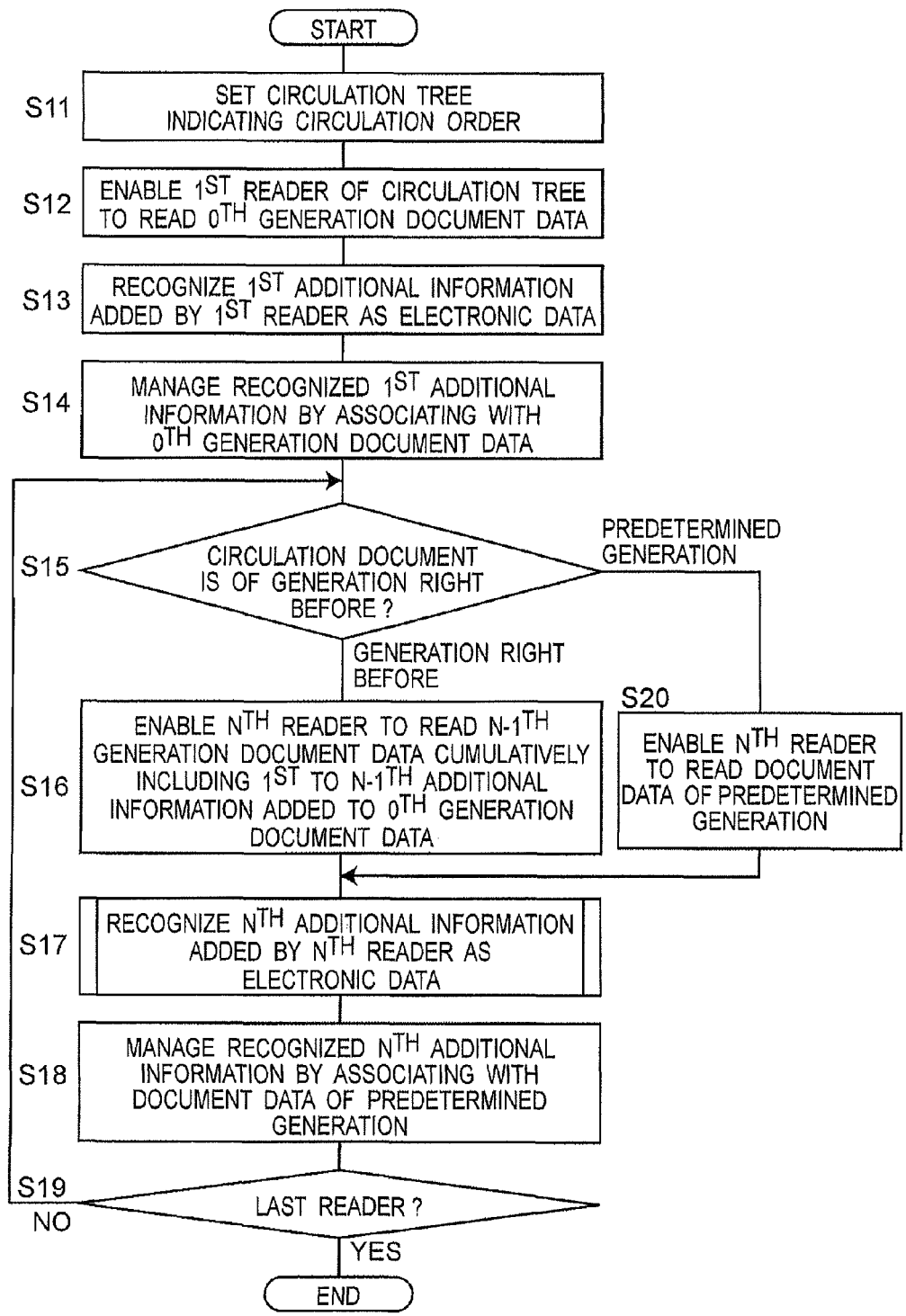
FIG. 7 is a flowchart showing the document management method according to the embodiment 2 of the present invention.
Figure 8:
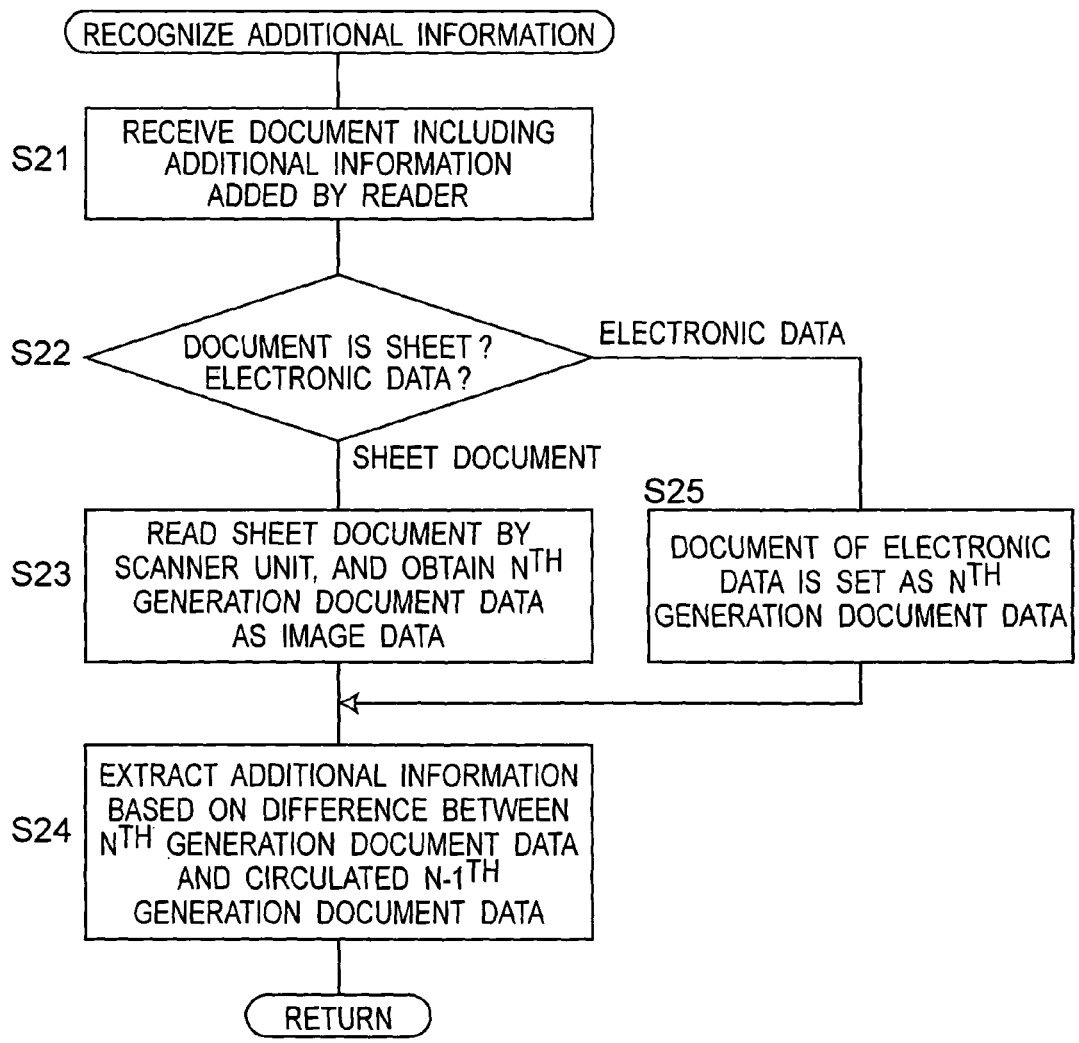
FIG. 8 is a flowchart showing steps S03 and S06 in FIG. 5 and steps S13 and S17 in FIG. 7 in detail.

FIG. 8 is a flowchart showing recognizing steps of the above-mentioned steps S03 and S06, and the steps S13 and S17 in FIG. 7.

(a) First, a document including additional information added by the reader is received (S21).

(b) The document is determined whether it is a sheet document or electronic data (S22).

(c) If the document is a sheet document, the sheet document is read by the scanner unit, and the $n^{th}$ generation document data is obtained as image data (S23). On the other hand, if the document is electronic data, the document of electronic data is set as the $n^{th}$ generation document data (S25).

(d) Additional information is extracted based on the difference between the $n^{th}$ generation document data and the circulated document data (S24). In this case, the difference can be obtained as image data, so this image data can be set as additional information.

In this way, additional information can be recognized as electronic data. Then, the processing returns to the first step.

Embodiment 2

Figure 6:
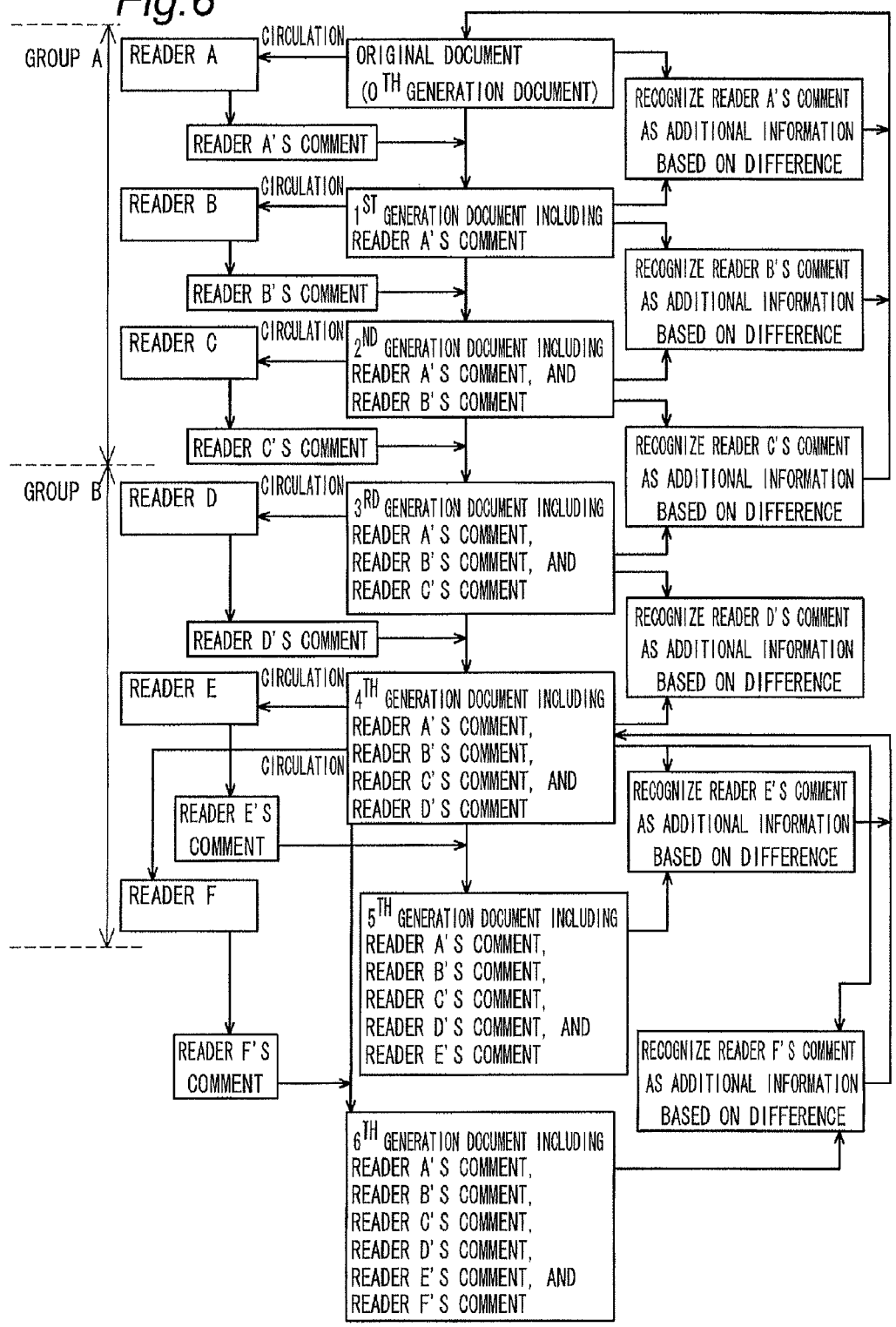
FIG. 6 is a schematic diagram showing an example of generation management of circulated documents and additional information in a document management method according to an embodiment 2 of the present invention.

A document management method according to an embodiment 2 of the present invention is different in that the circular document circulated to the readers of the group B is not a document of the generation right before but a document of the parent generation of the group B, comparing with the document management method according to the embodiment 1. Along with it, the subject document from which the difference for extracting additional information is a document of the parent generation of the group B. FIG. 6 is a schematic diagram showing circular documents circulated to respective readers of the group A and the group B and extraction of additional information, in the document management system in FIG. 3. By using FIG. 6, explanation will be given for the relationship between the circular documents and additional information when the document is circulated from the reader A via the reader B to the reader C of the group A and then from the reader D to the reader F of the group B.

Circulation within Group A:

(a) First, the $0^{th}$ generation document, which is the original document, is circulated to the reader A who is the first reader of the group A.

(b) The reader A adds comments to the $0^{th}$ generation document. This document in which the comments from the reader A are added to the oth generation document is the $1^{st}$ generation document.

(c) The comments from the reader A are extracted as additional information based on the difference between the $1^{st}$ generation document and the $0^{th}$ generation document.

(d) The additional information from the reader A is managed in association with the $0^{th}$ generation document which is the original document.

(e) Next, the $1^{st}$ generation document is circulated to the reader B.

(f) The reader B adds comments to the $1^{st}$ generation document. The document in which the comments from the reader B are added to the $1^{st}$ generation document is the $2^{nd}$ generation document.

(g) The comments from the reader B are extracted as additional information based on the difference between the $2^{nd}$ generation document and the $1^{st}$ generation document.

(h) The additional information from the reader B is managed in association with the $0^{th}$ generation document.

(i) Next, the $2^{nd}$ generation document is circulated to the reader C.

(j) The reader C adds comments to the $2^{nd}$ generation document. The document in which the comments from the reader C are added to the $2^{nd}$ generation document is the $3^{rd}$ generation document.

(k) The comments from the reader C are extracted as additional information based on the difference between the $3^{rd}$ generation document and the $2^{nd}$ generation document.

(l) The additional information from the reader C is managed in association with the $0^{th}$ generation document.

Circulation within Group B:

(a) Next, the $3^{rd}$ generation document is circulated to the reader D who is the first reader of the group B.

(b) The reader D adds comments to the $3^{rd}$ generation document. This document in which the comments from the reader D are added to the $3^{rd}$ generation document is the $4^{th}$ generation document. In the group B, additional information from each reader is managed in association with the $4^{th}$ generation document (parent generation document) including additional information from the first reader D (parent).

(c) The comments from the reader D are extracted as additional information based on the difference between the $4^{th}$ generation document and the $3^{rd}$ generation document.

(d) The additional information from the reader D is managed in association with the $4^{th}$ generation document.

(e) Next, the $4^{th}$ generation document is circulated to the reader E.

(f) The reader E adds comments to the $4^{th}$ generation document. The document in which the comments from the reader E are added to the $4^{th}$ generation document is the $5^{th}$ generation document.

(g) The comments from the reader E are extracted as additional information based on the difference between the $5^{th}$ generation document and the $4^{th}$ generation document.

(h) The additional information from the reader E is managed in association with the $4^{th}$ generation document.

(i) Next, the $4^{th}$ generation document is circulated to the reader F (j) The reader F adds comments to the $4^{th}$ generation document. The document in which the comments from the reader F are added to the $4^{th}$ generation document is the $6^{th}$ generation document.

(k) The comments from the reader F are extracted as additional information based on the difference between the $6^{th}$ generation document and the $4^{th}$ generation document.

(l) The additional information from the reader F is managed in association with the $4^{th}$ generation document.

In this way, in the group A, documents in which comments from the reader A to the reader C are added cumulatively are circulated to the next reader. Further, comments added by the respective readers are extracted based on the difference between the documents before and after the circulation, which are managed in association with the original document in the group A. In the group B, pieces of additional information are managed in association with the $4^{th}$ generation document data including additional information from the first reader D.

FIG. 7 is a flowchart showing a document management method according to the embodiment 2 of the present invention.

(a) First, a circulation tree indicating the circulation order of a plurality of readers is set (S11).

(b) The $0^{th}$ generation document data is made to be readable by the first reader in the circulation tree (S12).

(c) The $1^{st}$ additional information added by the first reader is recognized as electronic data (S13). This recognizing step S13 has been described above in detail together with step S17 relating to FIG. 8.

(d) The $1^{st}$ additional information recognized is managed in association with the $0^{th}$ generation document data (S14).

(e) As for the second and after readers, the circular document is determined whether it is a document of a generation just before (S15). In the circulation tree indicating the circulation order, it has been set which document of generation is used as a circular document. For example, in the group A, a document of a generation just before is used as a circular document, and in the group B, a document of the group parent generation is used as a circular document.

(f) If a document of a generation just before is used as a circular document, document data of the $n-1^{th}$ generation including the $1^{st}$ to the $n-1^{th}$ additional information cumulatively in the $0^{th}$ generation document data is made to be readable by the $n^{th}$ reader (S16).

(g) If a document of a predetermined generation is used as a circular document, document data of a predetermined generation set is made to be read by the $n^{th}$ reader (S20).

(h) The $n^{th}$ additional information added by the $n^{th}$ reader is recognized as electronic data (S17). This recognizing step S17 has been described above together with step S13 relating to FIG. 8.

(i) The $n^{th}$ additional information recognized is managed in association with the document data of the predetermined generation (S18). For example, in the group A, it is managed in association with the $0^{th}$ generation document. On the other hand, in the group B, it is managed in association with the document of the group parent generation.

(j) It is determined whether he/she is the last reader (S19). If he/she is the last reader, the processing ends. In contrast, if he/she is not the last reader, the processing moves to step S15 and determines a document circulated to the next $n+1^{th}$ reader.

In this way, circular documents and additional information from the readers can be managed in concentration.

Note that the document management method may be configured as a document management program by a computer program with which it can be executed in a computer. Further, this document management program may be stored on a computer readable recording medium.

EXAMPLE 1

Figure 9:
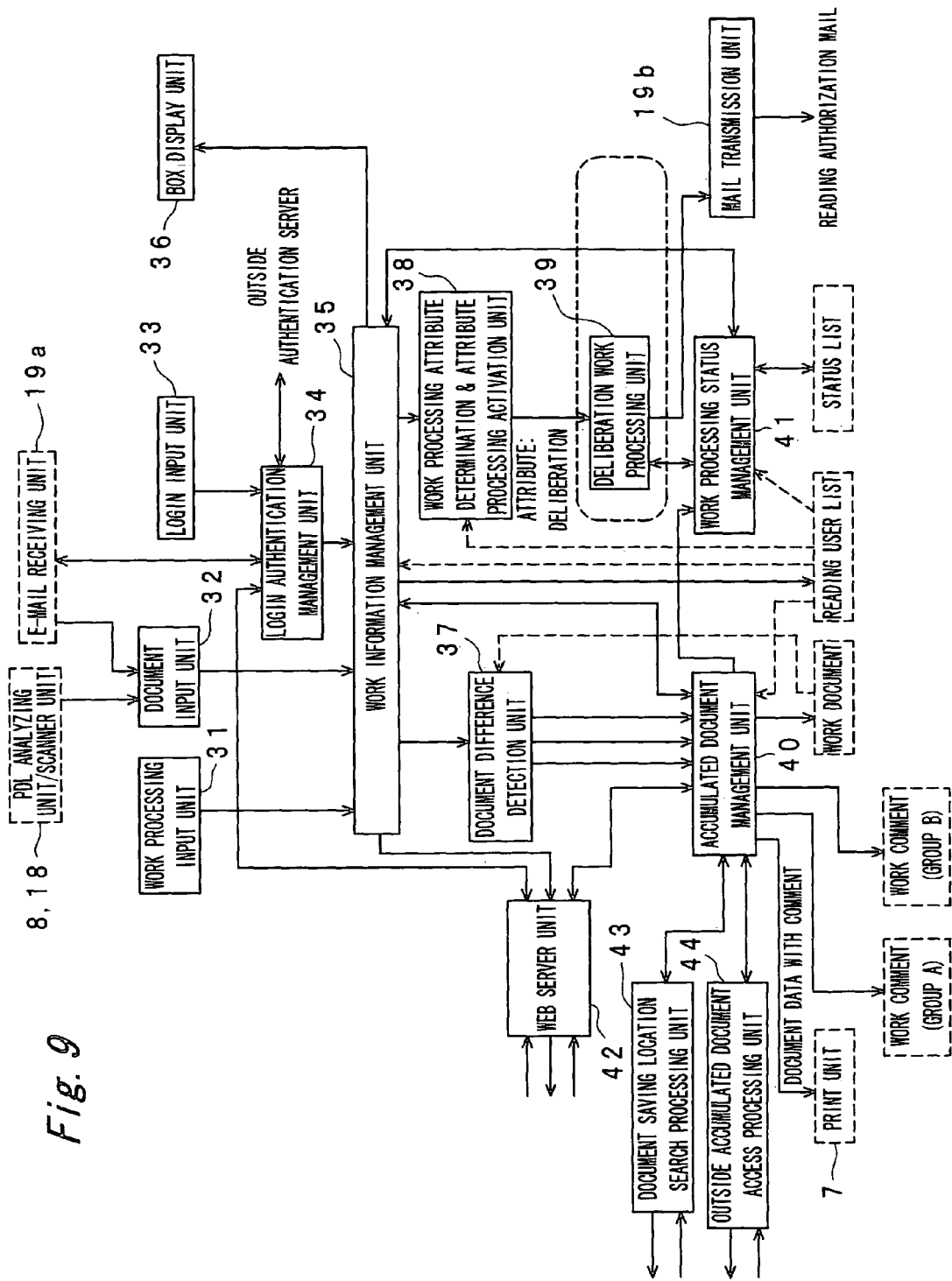
FIG. 9 is a block diagram showing the configuration relating to parameter processing of a controller of the document management device according to Example 1 of the present invention.

FIG. 9 is a block diagram showing the detailed configuration relating to processing of parameters of the controller 11 of a document management device according to Example 1 of the present invention. The controller 11 includes a work processing input unit 31, a document input unit 32, a login input unit-33, a login authentication management unit 34, work information management unit 35, a box display unit 36, a document difference detection unit 37, a work processing attribute determination & attribute processing activation unit 38, a deliberation work processing unit 39, an accumulated document management unit 40, a work processing status management unit 41, a web server unit 42, a document saving location search processing unit 43, and an outside accumulated document access processing unit 44. In FIG. 9, respective members are configured by dividing the functions by each processing of a parameter. On the other hand, in FIG. 2, respective constitutional members are configured by each function relating to processing of document data, not by each processing of a parameter. Therefore, each member in FIG. 9 and each constitutional member in FIG. 2 do not correspond one to one. The processing content of each member in FIG. 9 will be explained in each processing in a document management system including the document management device.

First, explanation will be given for a method of registering a deliberation document, which is a circular document, in a document management device by a manager of a document management system.

(1) A manager inputs a "deliberation mode" as a processing attribute from the work processing input unit 31 via the operating panel unit 17 of the document management device 10, and inputs a "deliberation party list" as a reading user list shown in Table 1 below, and inputs a "deliberation start instruction". Note that the reading user list is based on the relationship between the circular documents and additional information shown in FIG. 6 of the embodiment 2.

(2) The manager inputs a "deliberation start instruction", Further, in the case of a sheet document, it is converted into image data via the scanner unit 8 of the document management device 10, and in the case of the document being electronic data, it is inputted as document data via the PDL analyzing unit 18. In the document management device, the document inputted by the document input unit is received as a "deliberation document".

(3) When the work information management unit 35 of the document management device receives the "deliberation start instruction" from the work processing input unit 31, the work information management unit 35 issues a "work ID" having a unique value for each deliberation in order to manage a series of data such as "deliberation documents" so as to be associated with each other.

(4) At this time, the work information management unit 35 creates a "reading user list" based on information inputted, and stores in the inner memory.

(5) The work information management unit 35 notifies the work processing attribute determination & attribute processing activation unit 38 of the issued "work ID" and a "work processing activation request". Further, the work information management unit 35 transmits the "work ID" and the inputted "document data" to the document difference detecting unit 37.

TABLE 1

<Reading User List>
>work ID: 1
>work attribute: deliberation
>deliberation order
1. User ID: XX
   Group: A
   Parent: Yes
   Difference comparison hierarchy: Right before
2. User ID: YY
   Group: A
   Parent: No
   Difference comparison hierarchy: Right before
3. User ID: ZZ
   Group: A
   Parent: No
   Difference comparison hierarchy: Right before
4. User ID: pp
   Group: B
   Parent: Yes
   Difference comparison hierarchy: Right before
5. User ID: qq
   Group: B
   Parent: No
   Difference comparison hierarchy: Group parent
6. User ID: rr
   Group: B
   Parent: No
   Difference comparison hierarchy: Group parent
>final processing: mail to person who requests deliberation (6) When the work processing attribute determination & attribute processing activation unit 38 receives the "work ID" and the "work processing activation request", it refers to the "reading user list" in Table 1, and activates any one of work processing unit according to the "work attribute" corresponding to the "work ID". In this case, the deliberation work processing unit is activated.

(7) Then, the deliberation work processing unit 39, which has been activated, proceeds work processing by an event from the work processing status management unit 41.

(8) The document difference detection unit 37 inquires of the accumulated document management unit 40 whether the original document corresponding to the received "work ID" has already existed. Here, since the original document has not existed yet, a response of NO is returned. Therefore, the "work ID" and the "document data" are transmitted to the accumulated document management unit 40.

(9) The accumulated document management unit 40 accumulates the "document data" in a storing location of the work document associated with the "work ID" received. At this time, since the document associated with the received "work ID" is stored for the first time, the current generation No. of the work document is set to "0", and it is stored at a location of generation No.=0. The work document of the $0^{th}$ generation (generation No. 0) is set as the "original document".

(10) Upon receiving a request for registering the original document from the work information management unit 35, the accumulation document management unit 40 notifies the work processing status management unit 41 of the "work ID" and the "work start status".

TABLE 2

<Work Document>
>work ID: 0
>generation No. 0
>document data

(11) When the work processing status management unit 41 receives the "work start status", it creates a "status list" in Table 3 below from the "work ID" and the "reading user list".

(12) Next, the work processing status management unit 41 sets the status of the first user ID of the created "status list" as "now reading", and notifies the deliberation work processing unit 39, which is a work processing unit of the corresponding attribute, of a "status change notification".

(13) When the deliberation work processing unit 39 receives the "status change notification", it refers to the status list, and notifies the mail transmission unit to perform "reading authorization notification" to a user whose status has been changed.

(14) The mail transmission unit 19*b* transmits a "reading authorization mail" to the mail address of the user.

In this way, the manager can register the deliberation document in the document management device.

TABLE 3

<Status List>
>Work ID: 1
>User ID: XX
>Status
>Date
>User ID: YY
>Status
>Date
>User ID: ZZ
>Status
>Date
>User ID: pp
>Status
>Date
>User ID: qq
>Status
>Date
>User ID: rr
>Status
>Date Next, explanation will be given for a method of outputting by printing a deliberation document as a sheet document in processing of a user who is a reader receiving a "reading authorization mail".

(1) First, the user who is a reader inputs a "user name" and a "password" in the web server unit 42 of the document management device 10 vie a web browser of the PC which is a terminal.

(2) The web server unit 42 of the document management device 10 notifies the login authentication management unit of the "user name" and the "password" inputted.

(3) The login authentication management unit 34 transmits the "user name" and the "password" to an outside authentication server, checks whether the user is an authorized user, and notifies the web server unit of the "authentication result".

(4) If he/she is an authorized user, the "user ID" of the authorized user and "input unit: web input" are notified to the work information management unit 35.

(5) The work information management unit 35 notifies the accumulated document management unit 40 of a "document access request" and the "user ID". Then, the accumulated document management unit 40 refers to the reading user list so as to obtain the "work ID" from the "user ID", and returns the "document saving location" of the document data of the current generation No. within the work document associated with the "work ID".

(6) The work information management unit 35 notifies the web server unit 42 of the "document saving location" notified, according to the "input unit: web input".

(7) If the "authentication result" is access-authorized and the "document saving location" has been returned, the web server unit 42 transfers the screen to a document access request page.

(8) When a document in a box of the document saving destination indicated in the web browser is designated and a document print key is pressed, a "document print request" is notified to the web server unit.

(9) When the web server unit 42 receives the "document print request", it notifies the accumulated document management unit 40 of a "latest document print request".

(10) When the accumulated document management unit 40 receives the "latest document print request", it transmits "document data of the latest document" to the print unit 7, and also notifies the work processing status management unit of the "user ID" and the "printed status".

(11) The print unit 7 prints the "document data" received on a sheet.

(12) When the work processing status management unit 41 receives the "printed status", it changes the status corresponding to the user ID of the status list, in which the user ID is registered, to "printed", and notifies the deliberation work processing unit 39, which is a work processing unit of the corresponding attribute, of the "status change notification".

(13) When the deliberation work processing unit 39 receives the "status change information", it refers to the status list, and since the status is "printed", notifies the work processing status management unit 41 to change the status of the user, whose status has been changed, to "wait for deliberation".

(14) The work processing status management unit 41 changes the status of the designated user ID to "wait for deliberation".

In this way, the user can print the deliberation document on a sheet.

Next, explanation will be given for a method in which a user adds additional information such as comments on a printed sheet document by hand, and the sheet document including the additional information is inputted as a deliberation result.

(1) A user inputs a "user name" and a "password" in the login input unit 33 via the operating panel unit 17 of the document management device 10.

(2) The login input unit 33 notifies the login authentication management unit 34 of the "user name" and the "password" inputted.

(3) The login authentication management unit 34 transmits the "user name" and the "password" to an outside authentication server, checks whether the user is an authorized user, and notifies the login input part 33 of the "authentication result". If the user is an authenticated user, the login authentication management unit 34 notifies the work information management unit 35 of the "user ID" of the authenticated user and "input unit: device input".

(4) The work information management unit 35 informs the accumulated document management unit 40 of a "document access request: status confirmation" and the "user ID". Then, the accumulated document management unit 40 refers to the reading user list, and requests the work processing status management unit 41 for a "status confirmation request" by using the "user ID" as a parameter.

(5) When the work processing status management unit 41 receives the "status confirmation request", it refers to the reading user list so as to obtain the "work ID" corresponding to the "user ID", and returns the current status, as a reply, corresponding to the designated "user ID" from the status list corresponding to the "work ID" (in this case, "waiting for deliberation").

(6) Since the returned result is "waiting for deliberation", the accumulated document management unit 40 notifies the work information management unit 35 of the "deliberation document saving location" corresponding to the "work ID".

(7) The work information management unit 35 notifies the box display unit 36 of the "deliberation document saving location" notified, according to "input unit: device input".

(8) Since the "authentication result" is access-authorized, the login input unit 33 transfers the operating screen of the device to a box display screen.

(9) The user designates a box which is a deliberation saving destination displayed on the box display unit 36, and sets the deliberation document with comments written by hand at a scanning position, and presses the scan start key of the operating panel unit 17 of the document management device 10. Then, the scan unit 8 reads out the deliberation document, and the "document with comments" is notified to the document input unit 32.

(10) The document input unit 32 delivers the "document data with comments" to the work information management unit 35.

(11) The work information management unit 35 refers to the reading user list so as to obtain the "work ID" from the "user ID" of the user performing a scanner input, and transmits the "work ID", the "user ID" and the "document with comments" to the document difference detecting unit.

(12). The document difference detecting unit 37 inquires of the accumulated document management unit 40 whether the original document (document of generation No.=0) corresponding to the received "work ID" has already existed. Here, since a reply that the document data of generation No.=0 has existed is returned, the document difference detecting unit 37 compares the "document data with comments" with a "difference comparison base document", and extracts the comment portion.

(13) The difference comparison base document is set as follows: that is, a difference comparison hierarchy set in the received "user ID" of the reading user list corresponding to the received "work ID" is referred to, and since the value is any one of "right before/original/group parent/designated user", "document data" within the work document according to the value is set as the "difference comparison base document". If a document of the designated value does not exist, a document comparison is performed by assuming "right before" being designated. In this Example, in the case of user ID: XX (user A), the value is "right before", so a document of current generation No. is set as the "difference comparison base document". On the other hand, in the case of user ID: qq (user E), the value is "group parent", so a document of the "user ID: qq" (user D), who is the parent user of the "group B" which is the group to which the user E (user ID: qq) belongs, is set as the "difference comparison base document".

(14) The extracted "comment data" is transmitted to the accumulated document management unit 40 together with the "work ID" and the "user ID". Further, the "document data with comments" received is also transmitted to the accumulated document management unit 40 together.

(15) The accumulation document management unit 40 refers to the reading user list so as to classify the "work comment" from the "group" of the "user ID" and the "Work ID". Work comments from users of the group A are listed in the work comments shown in Table 4 below, and work comments from users of the group B are listed in work comments shown in Table 5 below, and are saved in a predetermined saving location. At this time, the current generation No. is incremented by "1" to thereby update the work document and list on the work document shown in Table 6 below so as to accumulate it at a the predetermined storing location.

TABLE 4

<Work Comments>
>Work ID: 1
>Group A
>Parent document: Generation No. 1
>User ID: XX
>Comment data
>User ID: YY
>Comment data
>User ID: ZZ
>Comment data

TABLE 5

<Work Comments>
>Work ID: 1
>Group B
>Parent document: Generation No. 4
>User ID: pp
>Comment data
>User ID: qq
>Comment data
>User ID: rr
>Comment data

TABLE 6

<Work Document>
>Work ID: 1
>Current generation No.
>Generation No. 0
>Document data
>Generation No. 1
>Document data with comments
>Generation No. 2
>Document data with comments
>Generation No. 3
>Document data with comments
>Generation No. 4
>Document data with comments
>Generation No. 5
>Document data with comments
>Generation No. 6
>Document data with comments

(16) When the accumulated document management unit 40 receives a request for accumulating a comment document from the work information management unit 35, the accumulated document management unit 40 notifies the work processing statue management unit 41 of the "work ID" and the "work document accumulation status".

(17) When the work processing status management unit 41 receives the "work document accumulation status", it sets the status of the "user ID" of the "status list" associated with the "work ID" to "document registration", and notifies the deliberation work processing unit 39, which is a work processing unit of the corresponding attribute, of a "status change notification".

(18) When the deliberation work processing unit 39 receives the "status change notification", it refers to the status list. Since the status is "document registration", the deliberation work processing unit 39 notifies the work processing status management unit 41 to change the status of the user whose status has been changed to "deliberation end", and to change the status of the next user ID in the reading order to "under deliberation".

(19) The work processing status management unit 41 changes the status of the designated user ID to the notified status. If there is no next user in the reading order, the work processing status management unit 41 notifies the deliberation work processing unit 39 of "circulation end".

(20) The deliberation work processing unit 39 notifies the mail transmission unit to send "reading authorization notification" to the user of the "under reading" status.

(21) Upon receiving the deliberation end notification from the work processing status management unit 41, the deliberation work processing unit 39 refers to the reading user list, and performs processing according to the final processing. For example, if the final processing is a "notification to a person requesting deliberation", the deliberation work processing unit 39 instructs the mail transmission unit 19b to send a deliberation end mail to the person requesting the deliberation.

In this way, when a user adds additional information such as comments by hand on a sheet document, the sheet document including the additional information can be inputted as a deliberation result.

EXAMPLE 2

A document management system according to Example 2 of the present invention is different in that a user (reader) performs deliberation with an electronic document and attaches comments as electronic data, comparing with the document management system of Example 1.

First, explanation will be given for a procedure to obtain a deliberation document in processing by a user receiving a "reading authorization mail".

(1) A user inputs a "user name" and a "password" on the web server unit 42 of the document management device 10 via a web browser of a terminal.

(2) The web server unit 42 of the document management device 10 notifies the login authentication management unit of the "user name" and the "password" inputted.

(3) The login authentication management unit 34 transmits the "user name" and the "password" to an outside authentication server, and checks whether the user is an authorized user, and notifies the web server unit 42 of the "authentication result". If the user is an authorized user, the "user ID" of the authorized user and "input unit: web input" are notified to the work information management unit 35.

(4) The work information management unit 35 notifies the accumulated document management unit 40 of a "document access request" and the "user ID". Then, the accumulated document management unit 40 refers to the reading user list so as to obtain the "work ID" from the "user ID", and returns a "document saving location" of the document data of the current generation No. within the work document associated with the "work ID".

(5) The work information management unit 35 notifies the web server unit 42 of the notified "document saving location" in accordance with "input unit: web input".

(6) If the "authentication result" is access-authorized and a reply of "document saving location" is returned, the web server unit 42 transfers the screen to a document access request page.

(7) When the user designates a document in the box of the document saving destination displayed on the web browser and presses the document obtaining key, a "document obtainment request" is notified to the web server unit 42.

(8) When the web server unit 42 receives the "document obtainment request", it notifies the accumulated document management unit 40 of a "latest document obtainment request".

(9) When the accumulation document management unit 40 receives the "latest document obtainment request", it transmits "document data of the latest document" to the web server unit 42 and notifies the work processing status management unit 41 of the "user ID" and the "transmitted status".

(10) When the work processing status management unit 41 receives the "transmitted status", it changes the status corresponding to the user ID of the status list in which the user ID is registered to "transmitted", and notifies the deliberation work processing unit 39, which is a work processing unit of the corresponding attribute, of a "status change notification".

(11) When the deliberation work processing unit 39 receives the "status change notification", it refers to the status list. Since the status is "transmitted", the deliberation work processing unit 39 notifies the work processing status management unit 41 to change the status of the user, whose status has been changed, to "waiting for deliberation".

(12) The work processing status management unit 41 changes the status of the designated user ID to "wait for deliberation".

In this way, the user can receive the deliberation document at a terminal.

Next, explanation will be given below for a method in which additional information which is electronic data is added to a deliberation document which is electronic data, and document data including the additional information is inputted as a deliberation result.

(1) The E-mail receiving unit 19*a* notifies the login authentication management unit 34 of a "user name" and a "password" attached to a received mail.

(2) The login authentication management unit 34 transmits the "user name" and the "password" to an outside authentication server, and confirms whether the user is an authorized user, and notifies the E-mail receiving unit 19*a* of the "authentication result". If the user is an authorized user, the login authentication management unit 34 notifies the work information management unit 35 of the "user ID" of the authorized user and "input unit: E-mail input".

(3) The information management unit 35 notifies the accumulated document management unit 40 of "document access request: status confirmation" and the "user ID". Then, the accumulated document management unit 40 refers to the reading user list, and notifies the work processing status management unit 41 of a "status confirmation request" by using the "user ID" as a parameter.

(4) When the work processing status management unit 41 receives the "status confirmation request", it refers to the reading user list so as to obtain a "work ID" corresponding to the "user ID", and returns the current status (in this case, "waiting for deliberation") corresponding to the designated "user ID" from the status list corresponding to the "work ID", as a reply.

(5) Since the returned result is "waiting for deliberation", the accumulated document management unit 40 notifies the work information management unit 35 of a "deliberation document saving location" corresponding to the "work ID".

(6) The work information management unit 35 notifies the E-mail receiving unit 19*a* of the notified "deliberation document saving location" in accordance with "input unit: E-mail input".

(7) Since the "authentication result" is access-authorized, the E-mail receiving unit 19*a* designates a "deliberation document saving location", and notifies the document input unit 32 of a "document with comments" attached to the mail.

(8) The document input unit 32 delivers the "document data with comments" to the work information management unit 35.

(9) The work information management unit 35 refers to the reading user list so as to obtain a "work ID" from the "user ID" of the user receiving the E-mail, and transmits the "work ID", the "user ID", and the "document data with comments" to the document difference detection unit 37.

The subsequent processing is omitted, since it is same as the processing after step (12) of inputting a deliberation document result document in the case of performing deliberation with a sheet document in the processing by the user receiving the "reading authorization mail".

Further, the document difference detection unit 37 separates comments on an electronic document or handwritten comments, corresponding to the document with comments notified.

EXAMPLE 3

Figure 10A:
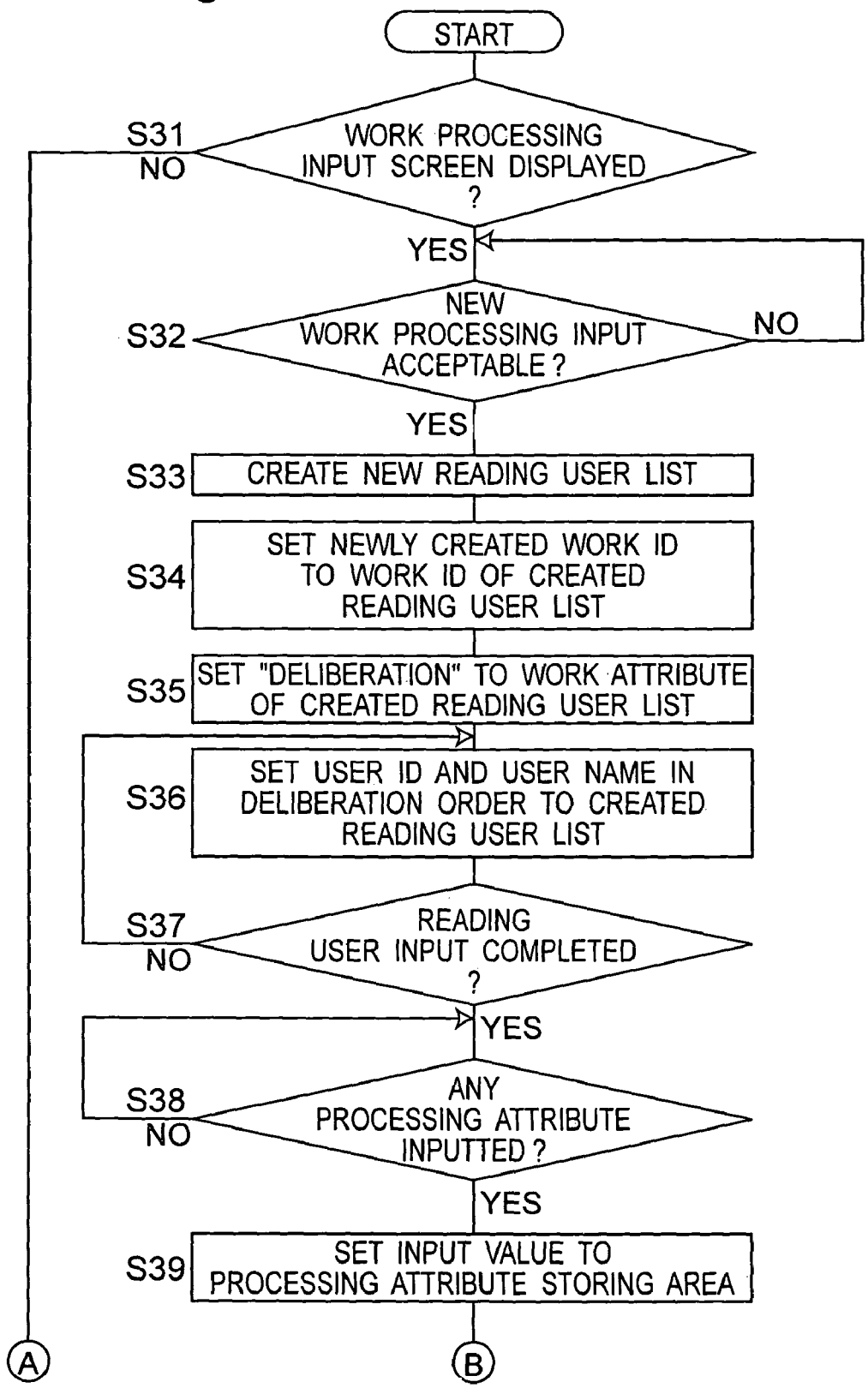
FIGS. 10A and 10B are flowchart showing a method of creating a reading user list according to Example 3 of the present invention.
Figure 10B:
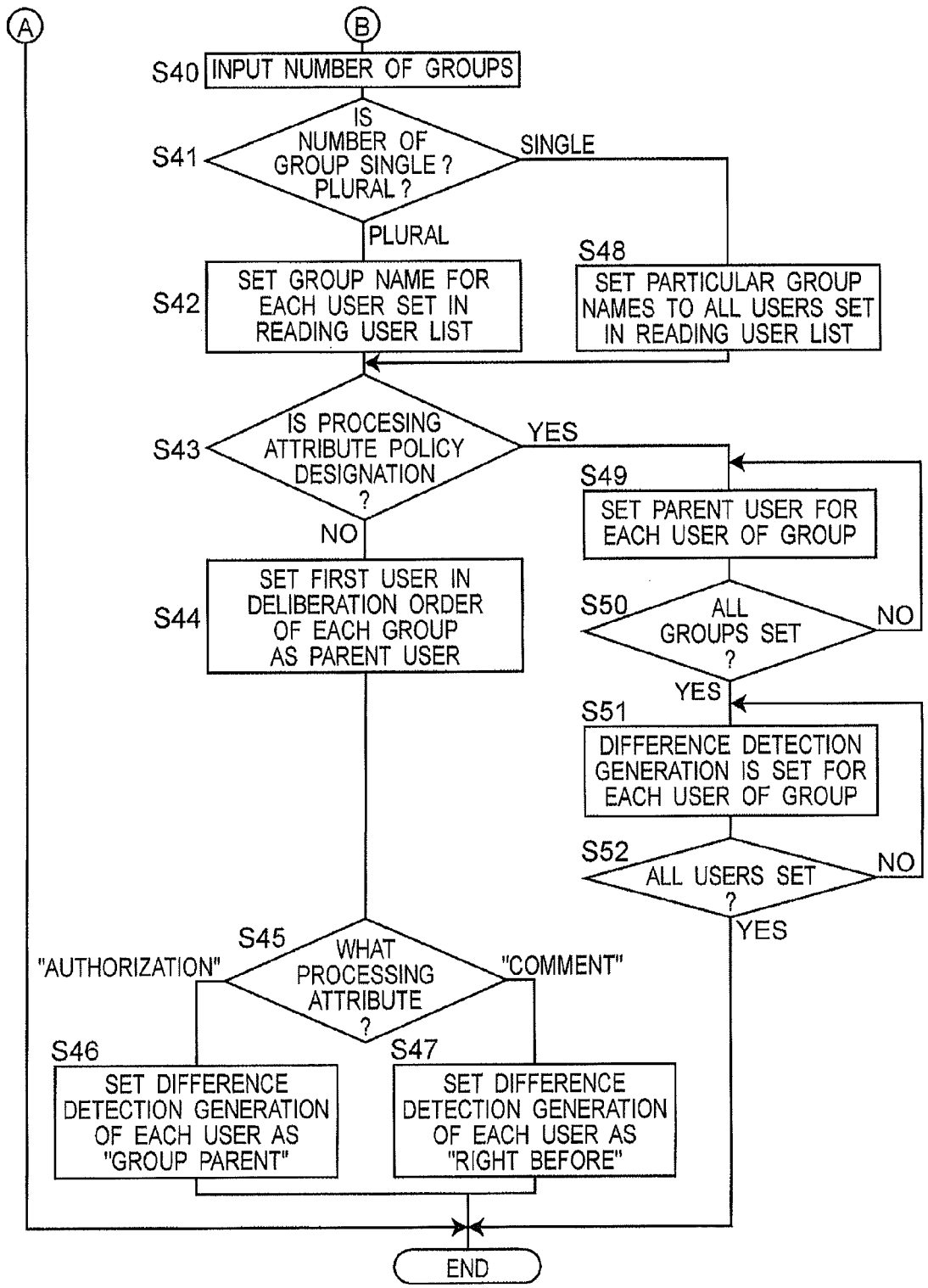

A document management method according to Example 3 of the present invention has characteristics in setting a processing attribute in a method of creating a reading user list, comparing with document management methods according to Examples 1 and 2. FIGS. 10A and 10B are flowchart showing a method of creating a reading user list in the document management method according to the example 3.

(a) First, it is determined whether a work processing input screen is on display (S31). If the display is not a work processing input screen, the processing ends.

(b) It is determined whether a new work processing input key is acceptable (S32). If an input key is not acceptable, an acceptance of an input key is waited again. If an input key is acceptable, the processing moves to the next step S33.

(c) A new reading user list is created (S33).

(d) A newly created work ID is set to the work ID of the created reading user list (S34). A work ID is set for each reading user list.

(e) "Deliberation" is set to the work attribute of the created reading user list (S35). Note that "deliberation" is a work attribute which means the document is subject to addition of comments or authorization.

(f) User IDs and user names are set in the deliberation order in the created reading user list (S36). Thereby, a reading user list as shown in Table 1 is created, for example.

(g) It is determined whether reading user input is completed (S37). When input of all reading users has been completed, the processing moves to the next step S38. On the other hand, if there is a reading user who has not been inputted, the processing is back to step S36.

(h) It is determined whether a processing attribute is inputted (S38). If it has not been inputted, an input of a processing attribute is waited. If it has been inputted, the processing moves to the next step S39.

(i) An input value is set in a processing attribute storing area (S39).

(j) Input of the number of groups is received (S40).

(k) It is determined whether the number of groups is a single or plural (S41).

(l) If the number of groups is plural, a group name is set for each user set in the reading user list (S42). On the other hand, if the number of groups is single, a particular group name is set to all users set in the reading user list (S48). Here, in a case of one reading user list including plural groups, management is performed by associating additional information with predetermined document data for each group.

(m) It is determined whether the processing attribute is "policy designation" (S43). If it is policy designation, the processing moves to step S49. On the other hand, if it is not policy designation, the processing moves to step S44.

(n) In the case of not policy designation, a user who is the first in the deliberation order of each group is set as a parent user (S44).

(o) It is determined whether the processing attribute is "authorization" or "comment" (S45). If it is "authorization", the processing moves to step S46, and if it is "comment", moves to step S47.

(p) If the processing attribute is "authorization", a difference detection generation of each user is set as a "group parent" (S46). Note that "difference detection generation" means a document which is the object of difference detection when extracting additional information. Then, creation of the reading user list ends.

(q) If the processing attribute is "comment", the difference detection generation of each user is set as "right before" (S47). Then, creation of the reading user list ends.

(r) If the processing attribute is "policy designation", a parent user is set to each user of the group (S49).

(s) It is determined whether setting has completed for all groups (S50). If there is a group which has not been set, the processing is back to step S49.

(t) A difference detection generation is set for each user of the group (S51).

(u) It is determined whether setting has completed for all users (S52). If setting has completed for all users, creation of the reading user list ends.

In this way, the "reading user list" can be created.

The document management device according to the present invention can be used as a device for managing documents circulated to readers in turn via network and additional information added to the documents by the readers.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A document management device, connected to a plurality of reader terminals via a network, for managing a document circulated to a reader in accordance with a circulation tree and additional information added to the document by the reader, the circulation tree indicating a circulation order of a plurality of readers, and each of the plurality of readers belonging to one of at least a first group and a second group, the device comprising:

a storing unit operable to store document data of a document that is circulated from a reader based on the circulation order of the circulation tree;

a reader identification information acquiring unit operable to acquire reader identification information of a reader from an input process via a console or a reader terminal by the reader;

a process receiving unit operable to receive a process with respect to the document data of the document that is stored in the storing unit;

a status storing unit operable to store the received process as a status in association with the reader identification information;

a notification unit operable to notify a storing location of the document to the console or the reader terminal based on the status stored in association with the reader identification information, the reader identification information being acquired;

a document acquiring unit operable to acquire a document data of the document by scanning a print of the document, or by receiving the document that is sent from the reader according to the notification, to store the document data in the storing unit;

a difference extracting unit operable to extract additional information added by a reader associated with the selected reader terminal to document data of the document or print of the document;

a setting unit operable to set a parent generation document for each group to which the reader belongs, the parent generation document being used to be associated with the additional information extracted by the difference extracting unit; and an additional information management unit operable to store the additional information extracted by the difference extracting unit in association with the parent generation document set for each group by the setting unit.

2. The document management device according to claim 1, wherein the difference extracting unit extracts the additional information as document data when it is added to the document data of the document, and extracts the additional information as image data when it is added to the print of the document.

3. The document management device according to claim 1, wherein the additional information management unit is operable to store the additional information extracted by the difference extracting unit and the parent generation document set for the group to which the reader belongs as a generation document created by the reader.

4. The document management device according to claim 1, wherein the parent generation document is used as the base to determine the additional information extracted by the difference extracting unit.

5. The document management device according to claim 1, wherein the reader receives the document and cumulative additional information to the document made by other readers.

6. A non-transitory computer readable medium encoded with computer executable instructions for managing a document circulated to a reader in accordance with a circulation tree and additional information added to the document by the reader, via a network connected to a plurality of reader terminals, the circulation tree indicating a circulation order of a plurality of readers, and each of the plurality of readers belonging to one of at least a first group and a second group, the computer executable instructions comprising:

storing document data of a document that is circulated from a reader based on the circulation order of the circulation tree;

acquiring reader identification information of a reader from an input process via a console or a reader terminal by the reader;

receiving a process with respect to the document data of the document that is stored;

storing the received process as a status in association with the reader identification information;

notifying a storing location of the document to the console or the reader terminal based on the status stored in association with the reader identification information, the reader identification information being acquired;

acquiring a document data of a document by scanning a print of the document, or by receiving the document that is sent from the reader according to the notification, to store the document data;

extracting additional information added by a reader associated with the selected reader terminal to document data of the document or print of the document;

setting a parent generation document for each group to which the reader belongs, parent generation document being used to be associated with the additional information; and storing the additional information in association with the parent generation document set for each group.

7. The computer readable medium according to claim 6, wherein in the course of extracting, the additional information is extracted as document data when it is added to the document data of the document, and the additional information is extracted as image data when it is added to the print of the document.

8. A method for managing a document circulated to a reader in accordance with a circulation tree and additional information added to the document by the reader, via a network connected to a plurality of reader terminals, the circulation tree indicating a circulation order of a plurality of readers, and each of the plurality of readers belonging to one of at least a first group and a second group, the method comprising:

storing document data of a document that is circulated from a reader based on the circulation order of the circulation tree;

acquiring reader identification information of a reader from an input process via a console or a reader terminal by the reader;

receiving a process with respect to the document data of document that is stored;

storing the received process as a status in association with the reader identification information;

notifying a storing location of the document to the console or the reader terminal based on the status stored in association with the reader identification information, the reader identification information being acquired;

acquiring a document data of a document by scanning a print of the document, or by receiving the document that is sent from the reader according to the notification, to store the document data;

extracting additional information added by the reader to the document data of the document or a print of the document;

setting a parent generation document for each group to which the reader belongs, parent generation document being used to be associated with the additional information; and storing the additional information in association with the parent generation document set for each group.

9. The method according to claim 8, wherein in the course of extracting, the additional information is extracted as document data when it is added to the document data of the document, and the additional information is extracted as image data when it is added to the print of the document.

* * * * *